United States Patent [19]

Nims

[11] Patent Number: 5,228,983
[45] Date of Patent: Jul. 20, 1993

[54] PARTICLE SEPARATOR

[76] Inventor: James E. Nims, 14701 SE. 5th Cir., Vancouver, Wash. 98684

[21] Appl. No.: 891,983

[22] Filed: May 28, 1992

[51] Int. Cl.$^5$ ............................ C02F 3/30; C02F 1/40
[52] U.S. Cl. ..................... 210/122; 210/151; 210/170; 210/242.1; 210/243; 210/259; 210/521; 210/540; 210/630
[58] Field of Search ............. 210/150, 151, 154, 220, 210/221.2, 243, 242.3, 242.1, 122, 202, 256, 259, 521, 532.1, 534, 535, 538, 540, 605, 630, 930, 170, 748

[56] References Cited

U.S. PATENT DOCUMENTS

| | | | |
|---|---|---|---|
| 3,371,033 | 2/1968 | Simmone et al. | 210/151 |
| 3,812,027 | 5/1974 | Jarvis et al. | 204/302 |
| 3,898,159 | 8/1975 | Okabe et al. | 210/705 |
| 3,970,556 | 7/1976 | Gore | 210/242.1 |
| 3,975,276 | 8/1976 | Schmid | 210/521 |
| 4,088,578 | 5/1978 | Yoshioka et al. | 210/540 |
| 4,136,012 | 1/1979 | Loubontin et al. | 210/521 |
| 4,366,063 | 12/1982 | O'Connor | 210/170 |
| 4,664,792 | 5/1987 | Fors et al. | 210/170 |
| 4,846,965 | 6/1989 | Clifft et al. | 210/195.3 |
| 4,923,609 | 5/1990 | Jardine | 210/636 |
| 4,929,349 | 5/1990 | Beckman | 210/151 |
| 5,049,266 | 9/1991 | Götz et al. | 210/151 |
| 5,720,435 | 6/1992 | Fink | 210/521 |

Primary Examiner—Stanley S. Silverman
Assistant Examiner—Christopher Upton
Attorney, Agent, or Firm—Kolisch, Hartwell, Dickinson, McCormack & Heuser

[57] ABSTRACT

A particle separator apparatus includes a pond and a separation vault, which receive a runoff stream. The vault includes an entrance for the runoff stream, the entrance having a primary skimmer thereabout for removing floating objects from the stream. A holding chamber is provided for catching and holding particulate matter as the particulate matter drops out of the runoff stream. The holding chamber includes a plate module, having plural corrugated plates spaced apart from one another therein, for providing the aerobic and anaerobic treatment to stabilize the runoff stream. A final skimmer is located at the rear of the vault, and includes a final skimmer plate which directs floating objects to a floating hose, which removes any remaining floating objects from the runoff stream.

20 Claims, 4 Drawing Sheets

PARTICLE SEPARATOR

BACKGROUND OF THE INVENTION

This invention is directed towards a water treatment facility for removing contaminants from a water runoff stream, such as the type of stream which runs off of ground surfaces and streets. More specifically, the apparatus of the invention includes a separation vault which promotes the separation of particulate matter and contaminants from a water stream, prior to the water stream entering a river or water course.

As urban boundaries expanded worldwide, clarification of surface runoff was neglected. The water which now enters water ways contains contaminants which promote growth of undesirable organic matter in the water ways. Water ways are therefore slowed in velocity, particularly during low-flow periods, with a resultant deterioration in, or elimination of, aquatic animal life of a result of pollution. Surface runoff contains the remnant of fertilizers and detergents, such as phosphorous and excess nitrogen, heavy metals from vehicular exhaust systems, petroleum products from vehicles and machinery, and animal waste products. In small quantities, none of these contaminants would pose a significant problem, however, in densely populated urban areas, these contaminants are sufficiently concentrated to destroy desirable life forms in urban waterways and make such waterways unsafe for human recreation.

A number of know processes are available for separating particles from waste water. Such processes include gravity separators, a variety of parallel plate separators with or without coalescing filters, the use of chemicals as flocculent or poly-electrolytes, electric ionizing systems, air floatation systems, pressure filters and osmosis systems.

Flocculators are used to enhance particle growth of particle agglomeration and floc formation after chemical addition. Flocculation always occurs in two successive stage: perikinetic flocculation and orthokinetic flocculation.

Perikinetic flocculation is the particle growth or aggregation which results from random thermal motion of fluid molecules, known as "Brownian Movement." Perikinetic flocculation and coagulation generally take place in a microscale in less than one second.

Orthokinetic flocculation is particle growth or aggregation resulting from induced velocity gradients in the fluid. This type of flocculation occurs slowly in flocculators, usually requiring several minutes for complete floc formation. Orthokinetic flocculation is the usual mechanism used in potable, process and waste water treatment.

Traditional flocculators employ paddle mixers and baffles located in continuously stirred tanks. Short circuiting and back mixing occurs in these tanks, which results in an increase time for detention of the effluent in the holding tank while all of the effluent is treated.

While these systems have varying degrees of effectiveness, they all have certain deficiencies, not the least of which is the introduction of residual chemicals in the runoff stream. Other processes are not fully effective, and may not remove an adequate amount of contaminants found in the runoff stream.

SUMMARY OF THE INVENTION

An object of the invention is to provide an apparatus for removing contaminants from a water runoff stream, and particularly for removing solid particles and phosphorus from that stream.

Another object of the invention is to provide an apparatus which will provide aerobic and aerobic treatment for water as the runoff stream slowly moves through a separation vault.

A further object of the invention is to provide an apparatus and method for removing contaminants, such as oil, from a runoff water stream.

Yet another object of the invention is to provide an apparatus which will alter, beneficially, the chemical and biological character of storm waste water.

Another object of the invention is to provide an apparatus which will introduce oxygen into a runoff stream.

Another object of the invention is to provide an apparatus which will provide a biological, non-powered removal of contaminants in a passive system.

The apparatus of the invention includes a pond and a separation vault, which receive a runoff stream. The vault includes an entrance for the runoff stream, the entrance having a primary skimmer thereabout for removing floating objects from the stream. A holding chamber is provided for catching and holding particulate matter as the particulate matter drops out of the runoff stream. The holding chamber includes a plate module, having plural corrugated plates spaced apart from one another therein, for providing the aerobic and anaerobic treatment to stabilize the runoff stream. A final skimmer is located at the rear of the vault, and includes a final skimmer plate which directs floating objects to a floating hose, which removes any remaining floating objects from the runoff stream.

These and other objects and advantages of the invention will become more fully apparent as the description which follows is read in conjunction with the drawings.

BRIEF DESCRIPTION OF THE DRAWINGS

FIG. 5 is a front section elevation of a geotextile fence element of the invention.

DETAILED DESCRIPTION OF THE PREFERRED EMBODIMENT

Figure 1:
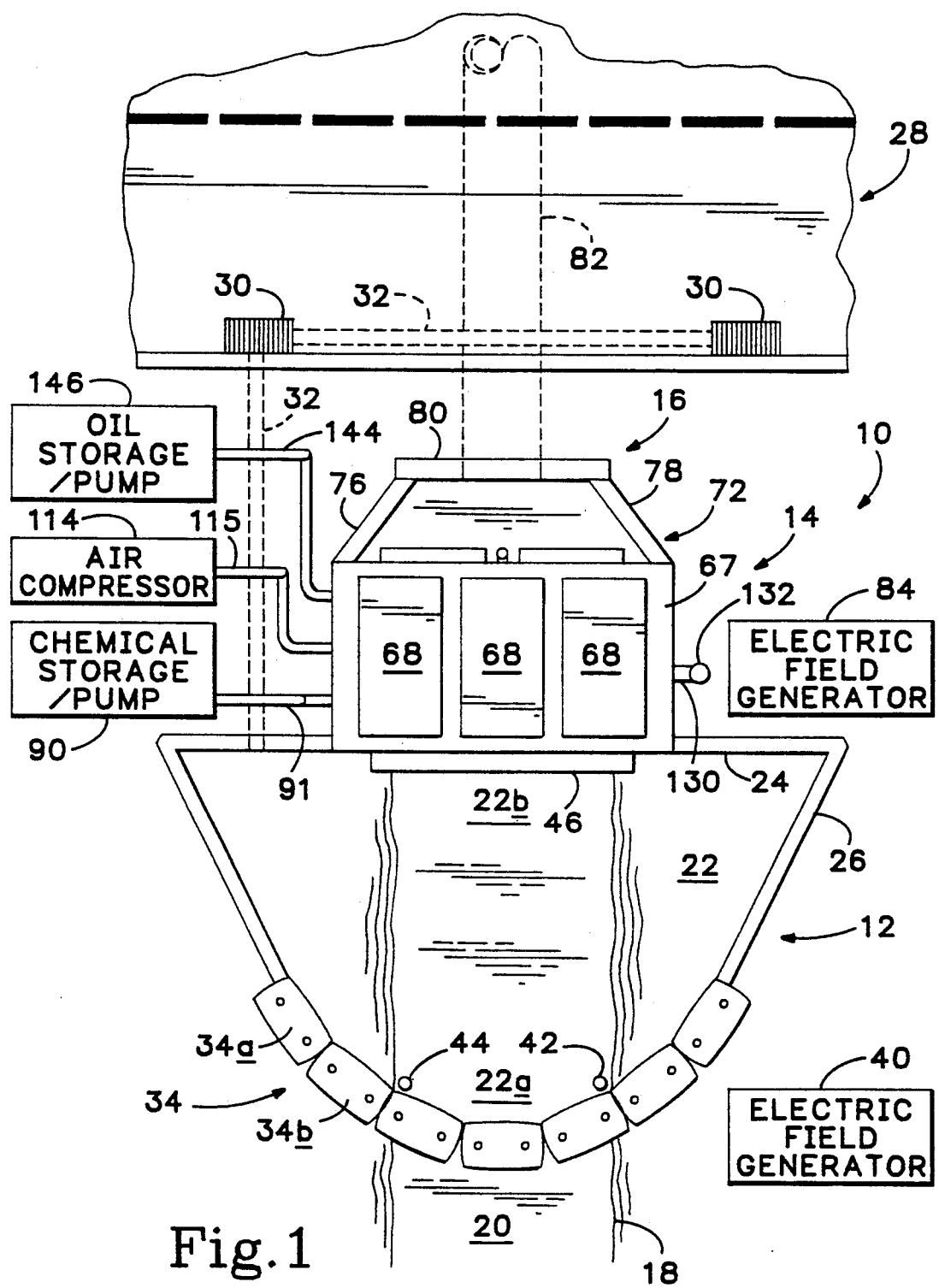
FIG. 1 is schematic top plan view of the apparatus of the invention.

Turning initially to FIG. 1, the apparatus of the invention is depicted generally at 10. Apparatus 10 includes a collection system 12, a separation vault 14 and a runoff stream conduit 16.

Collection system 12 is located generally over a naturally occurring stream bed 18 which receives a runoff stream 20 from the surface of the ground. A receiving pond 22 is formed, which has an entry end 22a and an exit end 22b thereto. A dam structure 24 may be provided, as may a pond containment structure 26, depending on the orientation of stream 20 and the topography of the area where the apparatus is installed.

Runoff from streets, such as street 28 may be directed into drains 30 and pass through conduits 32 into pond 22, which pre-screens the runoff stream prior to the stream entering the separation vault. Although depicted in FIG. 1 as a receiving pond 22 and a runoff stream conduit 16, it will be appreciated by those of skill in the art that the pond may be replaced by a storage chamber or other reservoir-type structure, and that the conduit may be a stream or other natural or man-made structure which will direct effluent away from separation vault 14. Stream bed 18 may be a natural stream, or may be an underground collection pipe, which is placed in a rock bed and possibly wrapped with a filtering fabric to provide an initial filter for the system.

One feature of the invention is the provision of a geotextile prescreening fence, shown generally at 34 which is arrayed across entry end 22a of receiving pond 22. Fence 34 includes geotextile elements 34a, 34b, etc. Turning briefly to FIG. 5, one technique for forming the elements of geotextile fence 34 is to form a bale of hay 36, and cover the bale with a fiberglass mat 38. Geotextile fence elements are operable to remove large particulate matter from runoff stream 20 when such particulate matter is larger than five millimeter in cross-section. Particles will be retained in the fiberglass mat or in the bale. The geotextile fence element may be periodically removed and disposed of in an environmentally acceptable manner.

Apparatus 10 includes an electric field generator 40 which is connected to the electrostatic field electrodes 42, 44, and which are operable to form a first electrostatic field across runoff stream 20 adjacent entry in 22a of receiving pond 22. Electrodes 42, 44, in the preferred embodiment, are spaced at least four feet apart. Generator 40 may produce an AC or DC field, and may be of the generator type which is used with electrified fences. The first electrostatic field causes an ion change in the particle field, thereby causing an electric charge to promote separation of particles from the runoff stream. The particles may either rise to the surface of the pond, or drop to the bottom thereof.

Figure 2:
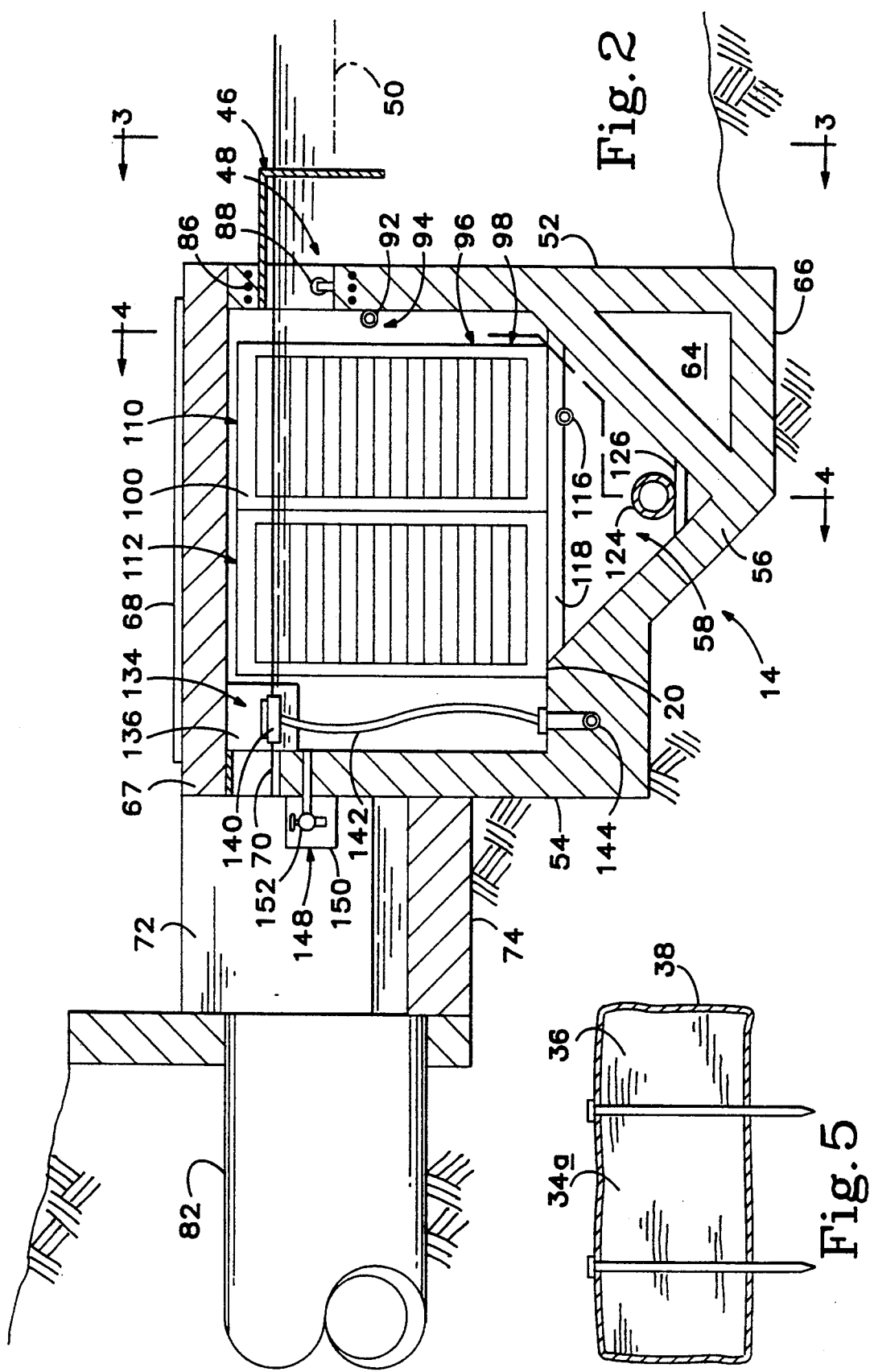
FIG. 2 is a side sectional elevation of the apparatus of the invention.
Figure 3:
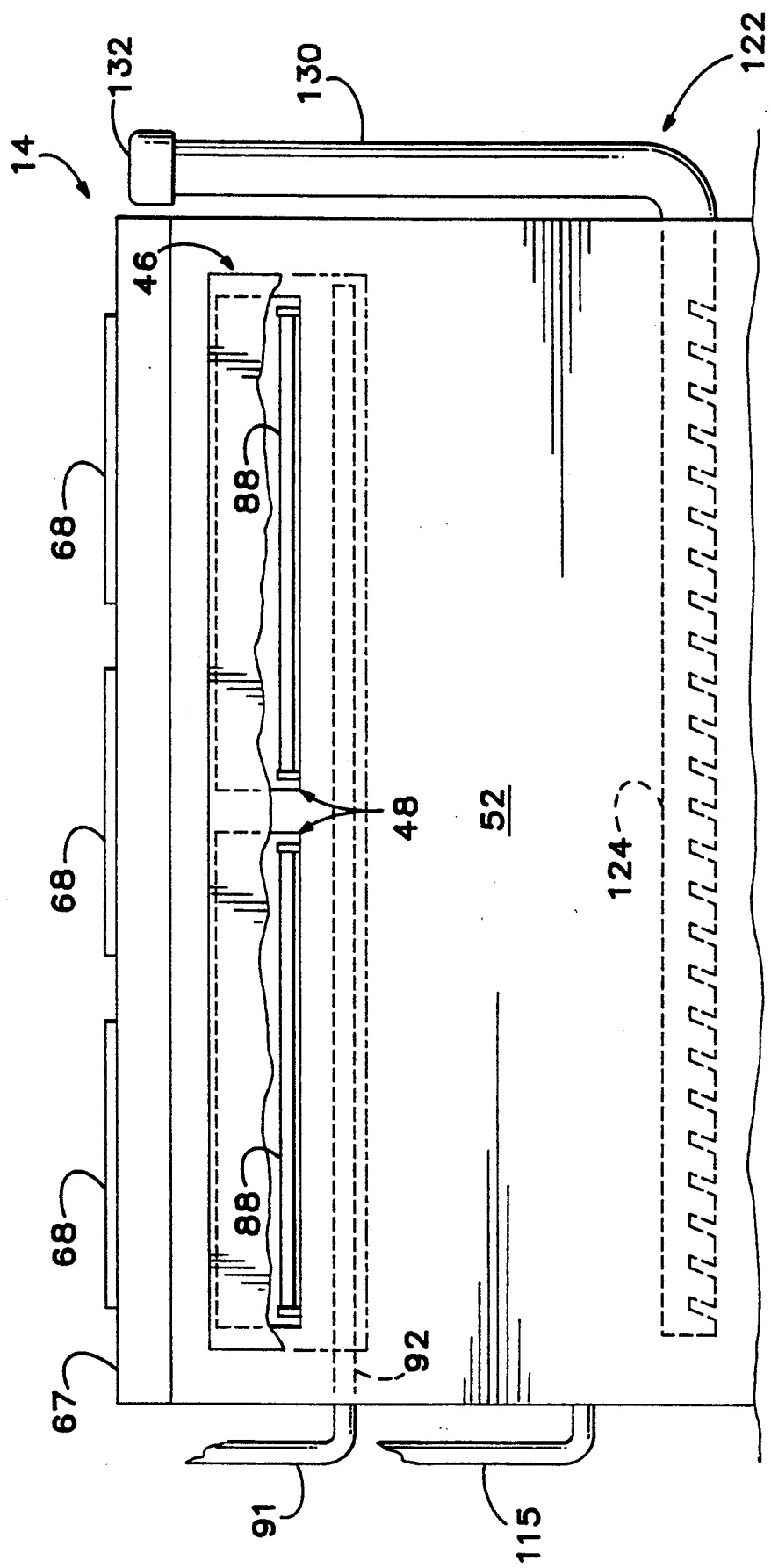
FIG. 3 is a front elevation of a separation vault of the invention.
Figure 4:
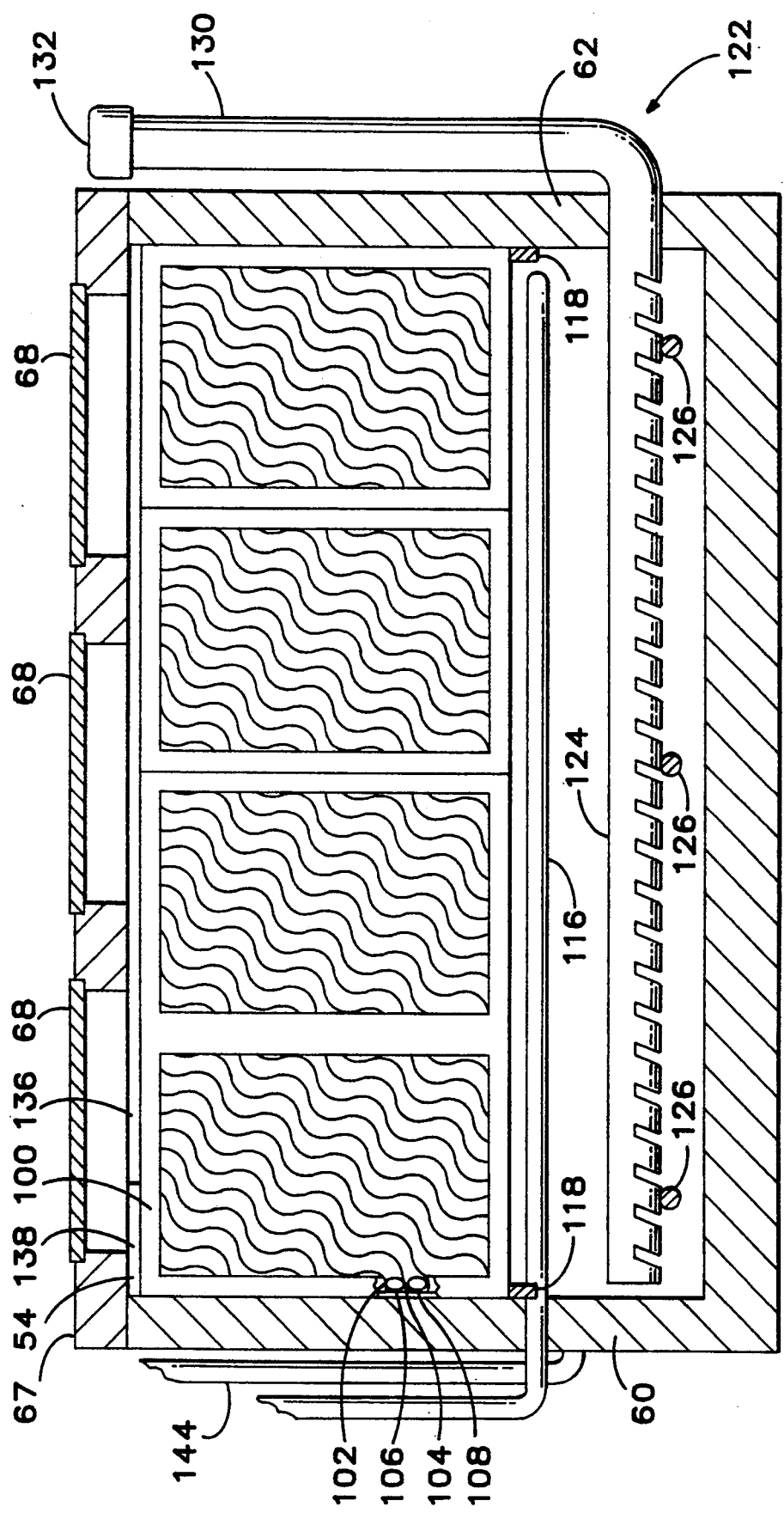
FIG. 4 is a front section of the separation vault of the invention, taken generally along the line 4—4 of FIG. 2.

Referring now to FIGS. 1 and 2, separation in vault 14 includes a primary skimmer 46 which prevents floating objects from entering the interior of vault 14. In the preferred embodiment, skimmer 46 is attached to the top of an entrance 48 to vault 14. Skimmer 46 extends approximately six inches below the surface of pond 22 when the pond is at its lowest level where runoff may enter vault 14, as represented by dot-dash line 50.

Vault 14 is, in the preferred embodiment, a poured-in-place concrete structure, having suitable reinforcement therein and having a front wall 52, a rear wall 54 and a V-shaped base 56 which defines a substantially V-shaped holding chamber 58. Side walls 60, 62 form the completed vault. As depicted in FIG. 2, a chamber 64 is defined by an extension of front wall 52 and a secondary base 66. This construction is provided in order to stabilize vault 14 in the ground. Chamber 64 may be used for storage of treatment chemicals if desired.

In the preferred embodiment, a precast, concrete top 67 is provided which is placed on the upper edges of the walls of the vault. Metal covers 68 are provided to fully enclose the vault.

Vault 14 includes, in the preferred embodiment, a pair of spaced apart exit points 70 which allow water to flow through the rear wall of the vault into a runoff conduit 16, which includes a holding basin 72. Holding basin 72 includes a concrete floor 74, side wall 76, 78 and a rear wall 80, which has a culvert 82 connected thereto, for final direction of the runoff stream to a water course. Entrance 48 and exit points 70 are designed to accommodate heavy runoff, or storm conditions, and are constructed to allow such heavy flow to pass through the upper region of vault 14 and into runoff conduit 16.

Continuing with the description of vault 14, a second electric field generator 84 is operably connected to a coil 86 for producing a second electrostatic field. Coil 86 surrounds entrance 48 to vault 14. The second electrostatic field is operable to charge the particles as they enter vault 14, thereby facilitating removal of the particles from the runoff stream.

A light 88 is provided within entrance 48 so that the turbidity of the runoff stream entering vault 14 may be observed. Turbidity may be monitored by removing one of metal covers 68, or by providing a video monitoring camera within vault 14.

While it is desireable to remove contaminants without adding chemical to the runoff stream, which the apparatus will accomplish in most instances, chemicals may be injected into the runoff stream if necessary. A chemical additive may be injected into the runoff stream in order to promote precipitation or flocculation of particulate matter within the runoff stream when water clarity tests establish that excess contaminates are present in the water leaving vault 14 through exit 70. A chemical storage tank and pump 90 are provided, and may be located externally of vault 14, as depicted in FIG. 1, or may occupy chamber 64.

Suitable chemicals are pumped through a conduit 91 to an injection pipe 92 which extends across the width of vault 14 adjacent entrance 48. Chemical storage tank/pump 90 and injection pipe 92, and the associated plumbing which connects the two, are referred to collectively herein as a chemical injector. The specific chemicals used, and the results of using such chemicals will be discussed later herein.

A gap 94 is provided between injection pipe 92 and a collection of plate modules, depicted generally at 96. Gap 94 is provided so that particulate matter which is ready to fall out of the runoff stream will have a free passage to the bottom of holding chamber 58.

The collection of plate modules, in the embodiment depicted, includes eight individual modules which are arranged, in the preferred embodiment, in two rows of four modules each. An individual module, and now referring to module 98, includes a framework 100 which is substantially cuboid structure having a number of corrugated plates, such as plates 102, 104 which are carried in framework 100. Framework 100, in the preferred embodiment, is formed of angled material which receives the corrugated plates. Spacers 106, 108, are provided to provide spacing between the corrugated plates. In the preferred embodiment, spacers 106, 108 are formed of fiberglass material. Framework 100, for each module, is constructed to link together with adjacent frameworks.

The corrugated plates are arranged within framework 100 in an orientation that provides an angle of between fifty degrees and seventy degrees from the horizontal. In the preferred embodiment, the plates are angled at sixty-two degrees. The corrugations in the plate are approximately one-half inch deep and approximately two and three-quarters inch long. The plates develop a bioslime, attract small particles and promotes both anaerobic and aerobic treatment of the runoff stream as the runoff stream moves through the plates. Additional particulate matter will drop out of the runoff stream as particles aggregate when the stream passes through the plates. The open bottoms of framework 100 allow this particulate matter to drop down into the bottom of holding chamber 58.

The first row 110 of modules provides aerobic treatment of the runoff stream, while the second row 112 provides anaerobic treatment. Approximately 90% of the particulate contained in the runoff stream will be precipitated out of the stream within the first foot on first row 110 as the runoff stream passes over the plates. Under normal flow, this action will take approximately one second.

After the aerobic treatment is provided in row 110, the runoff stream passes through second row 112, which is oxygen deprived. The action of the bioslime located on the plates of the second row modules and the lack of oxygen in this row, results in an anaerobic treatment of the runoff stream.

In order to promote aerobic treatment of the runoff stream, an air compressor 114 is provided which is connected, by a conduit 115, to an air injector pipe 116. In the preferred embodiment, air compressor 114 includes a three-quarter horse electric motor. It should be noted that for some remote locations, any of the pumping mechanisms may be solar or hydro powered. Air compressor 114, conduit 115, and air injector pipe 116 comprise what is referred to herein as an air injection system.

Plate modules 96 are supported within holding chamber 58 by a support bracket 118 which extends along side walls 60, 62 of the chamber, and by a lower, horizontal surface 120 of vault 14.

Vault 12 includes an eduction mechanism shown generally at 122, for removing particulate matter from the bottom of holding chamber 58. Eduction mechanism 122 includes an eductor pipe 124 which is located adjacent the bottom of holding chamber 58, and is supported by cross members 126.

Eductor pipe 124 includes spaced apart slits 128 which are formed in the bottom half thereof, and which allows sediment, cause by the precipitation of particulate matter out of the runoff stream, to be drawn into the pipe and disposed of. In the preferred embodiment, this is accomplished by means of an external connection 130, which is a continuation of pipe 124 in the preferred embodiment, and which extends through side 62 of vault 14 to a point above ground level. A cap 132 is provided to close connection 130. In the depicted embodiment, eductor pipe 124 is a four-inch steel pipe having ¼-inch slits formed therein, wherein the slits are angled at approximately 23° from the vertical. This angled formation of the slits precludes the buildup of sediment in pipe 124 until such time as a vacuum is applied to the pipe to withdraw sediment from chamber 58.

Periodically, holding chamber 58 is cleared of particulate matter by connecting a pumping mechanism to connection 130 and drawing water and precipitated particulate matter out of the bottom of holding chamber 58. This precipitate, or sludge, may be disposed of in any number of environmentally suitable methods, such as spreading and drying, or treatment in a conventional sewage treatment facility.

After the runoff stream has passed through the plate modules, it encounters a final skimmer 134, which includes a final skimmer plate 136, which extends from vault side 62 along rear wall 54 of the vault. Final skimmer plate 136 extends below the level of exit point 70 so that any runoff stream leaving the exit point must percolate under the lower edge of final skimmer plate 136. A small pocket 138 is located between side wall 60 and the end of final skimmer plate 136. An oil skimmer 140 is located in pocket 138 and is operable to collect any floating material, which would be expected to be primarily of a petroleum base nature, in pocket 138. Skimmer 140 is connected to a floating hose 142, or other type of disposal port, which is in turn connected to a skimmer conduit 144 which passes through side 60 and is connected to an oil storage tank/pump 146. Skimmer 140 is a concentric structure, having several floats attached thereto. The upper surface of skimmer 140 is at water level, and allows the entrance of oil and other lighter-than-water objects into the central area of the skimmer, which is connected to hose 142. Oil, and other floating materials which are collected by skimmer 140, is stored in the oil storage facility until such time as they can be removed and suitably disposed of.

A polishing filter, 148, extends across the rear of vault 14 under exit points 70 to polish the runoff stream prior to the runoff stream being directed towards a water course. In the preferred embodiment, filter 148 includes a wire mesh frame 150 having carbon blocks placed therein.

A sampling facet 152 may be provided to allow sampling of the runoff stream which is located inside of vault 14 without having to remove covers 68.

OPERATION

As runoff stream 20 is collected from surface runoff and runoff from street 28, it collects a variety of contaminants, such as various petroleum product and their residues, fertilizers and other substances, which, if introduced untreated into a water course, such as stream or a river, will pollute the stream and promote the growth of undesirable organic organisms, such as algae and of plant life which will choke aquatic animal life. One of the primary contributors to algae growth is the presence of phosphorus, which is a common byproduct of fertilizers and detergents, and which promotes plant growth. The introduction of phosphorus compounds into a slow moving stream will tend to enhance the growth of plant life which may have a detrimental effect on animal life in the water course. In addition to organic contaminants, various heavy metals may wash out of either naturally occurring deposits or be included in the runoff stream as the runoff stream passes over areas where heavy metals have been dumped or otherwise deposited.

The first obstacle which the particles encounter is geotextile fence 34, which is previously noted, will remove particles larger than five millimeters from the runoff stream.

First electric field generator 40 produces a field between posts 42 and 44, which may be either AC or DC, and which places a field through runoff stream 20 which causes negative and positive particles to be charged, allowing the particles to either rise or fall.

Any large floating particles which remain on the surface of receiving pond 22 will collect against primary skimmer 46 and are precluded from entering vault 14. Light 88, as previously noted, may be used to visually check the turbidity of runoff stream 20 as it enters vault 14. Sampling facet 152 may be used to draw a water sample immediately prior to the runoff stream exiting vault 14. Turbidity comparisons may therefore be made of runoff stream 20 as it enters and exits the vault. An additional light may be placed in exit 70, with or without a monitoring device, if desired.

The chemical injector may be used when it is determined that it is necessary to enhance the removal of particulate matter from the runoff stream, if, for instance, the removal of particulate matter is less than that required by statutory protocols. The amount of participates and water departing exit point 70 may be determined by a standard jar test, by drawing water through sampling facet 152.

The choice of treatment chemicals is determined by the results of the jar test on the runoff stream. The jar test is a sampling process wherein runoff water undergoes a variety of analytical procedures, which use different chemicals to cause rapid rising or settling of particulates in the runoff stream. Chemicals commonly recognized for these uses are aluminum sulfate, lime, sodium aluminate, cationic polymer resins, polyamino amine, magnesium chloride, zinc chloride, bentonite and activated silica. Once the jar test has established which chemical or chemicals are appropriate to precipitate or flocculate particulate matter in the runoff stream, the appropriate chemical is pumped into injector pipe 92 from chemical storage 90. It should be noted that the chemical storage area may include a variety of containers of various chemicals which may be mixed prior to injection into vault 14.

Gap 94 is provided between wall 66 and plate modules 96 to allow particulate matter to fall to the bottom of holding chamber 58. In most instances, a minimum gap of six inches should be provided between injector pipe 92 and the leading edge of the plate modules.

As previously noted, plate modules 96 include individual modules 98 having an array of plates spaced apart therein. In the preferred embodiment, the modules are approximately two feet by two feet, as viewed from the top or bottom, and four feet high. The modules are so formed so that they may be removed from the vault without the need for heavy lift cranes. Removal of modules from the vaults requires lifting cover 67 and cover plates 68 off of the top of vault 14.

The plates may be of any reasonable thickness, as the use of the plate is relative the surface area thereof. The surface area on each side of the plate is related to the amount of biological removal for aerobic or anaerobic treatment. Tests have demonstrated a removal of ninety percent of biological particles in relationship to the total particles entering vault 14. Approximately 60% of entering particulate matter is removed in the first row 110 of plates, while approximately 30% of the particulate matter is removed by second row 112. About 10% will remain in the runoff stream.

The plates may be constructed of any material that will not be affected by the flow of fluid carrying the particles which are to be separated. The types of material which may be utilized are aluminum alcad, stainless steel, fiberglass, treated cardboard, treated paper, polyethylene, polyvinyl chloride, or other inert substances.

Framework 100 is preferably made of stainless steel in order to resist corrosion. Other materials may be used so long as they are corrosion resistant to the chemicals and particulate matter which may be found in the runoff or waste water stream.

A control system, with monitoring devices, may be provided to automate the apparatus, particularly where it is possible to provide on-site storage of collected particulate matter. The control system may include monitors to detect precipitate level in chamber 58, and to automatically pump collected material into an auxiliary holding pond. Likewise, automatic water quality test equipment may be installed to monitor particulate levels in the discharged runoff stream, and to automatically introduce chemical treatment into the runoff stream.

Tests have demonstrated that up to ninety percent of the phosphorus contained in dirt particles, generally accepted to be a fertilizer residue, may be removed by the apparatus of the invention, thereby bringing discharged phosphorus levels down to 67% or 30 parts per million. This compares with nationally accepted standards, as set forth in 40 CFR parts 122, 123 and 124 of 30 parts per million. The reduction of significant levels of phosphorus in the runoff stream will slow the growth of undesirable organic material in the water course, resulting in a more viable environment for desirable aquatic life.

In some instances, it may be appropriate in install recovery systems to collect heavy or precious metals from the precipitated particulate matter.

The apparatus of the invention is adequate to handle up to 0.25 inch per hour of rain fall. Should the rain fall rate exceed 0.25 inch per hour, it is believed that sufficient flushing of the water course will be achieved by natural means. The opening for water entry is sized so runoff will pass water through separation vault 14 at a speed where the anaerobic/aerobic treatment will occur. Storms of a greater intensity will produce enough water such that the runoff will flow over the top of the separator. Generally, surface material will be skimmed off of the runoff stream, and, even in the event of an "annual" storm, most particulate matter will have an opportunity to precipitate out of the stream.

Although a preferred embodiment of the invention has been disclosed, it should be appreciated that variations and modifications may be made thereto without departing from the scope of the invention as define in the appended claims.

What I claim is:

1. Apparatus for removing contaminants, including particulate matter, from a water runoff stream comprising:
    a separation vault for receiving the runoff stream; said vault having an entrance for the runoff stream thereto; and including:
    a primary skimmer at said entrance for preventing floating objects from entering the vault;
    a holding chamber at the base of the vault for catching and holding particulate matter as the particulate matter drops out of the runoff stream;
    at least one plate module, having plural corrugated plates spaced apart from one another therein for providing a support for bioslime for aerobic and then annerobic treatment of the runoff stream; and
    a final skimmer located at the rear of said vault, including a final skimmer plate for directing floating objects and a floating hose for removing floating objects from said runoff stream.

2. The apparatus of claim 1 which includes a collection system for collecting runoff including a receiving pond for receiving runoff, and screening material at the entrance of the pond for pre-screening large particles.

3. The apparatus of claim 2 which further includes a first electrostatic field generator for generating an electrostatic field along a stretch of said pond.

4. The apparatus of claim 2 wherein said screening material includes a geotextile fence arrayed across an end of said pond to remove particulate matter from the runoff.

5. The apparatus of claim 1 which includes a second electrostatic field generator for generating an electrostatic field about said separation vaul entrance.

6. The apparatus of claim 1 wherein said vault includes a chemical injector for injecting a precipitation/flocculation-causing chemical into the runoff stream.

7. The apparatus of claim 1 which includes an air injection system for injecting air into runoff contained in said vault in the vicinity of the aerobic treatment plates.

8. The apparatus of claim 1 wherein said holding chamber includes an eduction mechanism for removing particulate matter which is collected in said holding chamber.

9. The apparatus of claim 1 wherein said vault has an exit point and includes a filter located across said exit point for finally filtering particulate matter from the runoff stream.

10. Apparatus for removing contaminants, including particulate matter, from a water runoff stream comprising:
   a collection system for collecting runoff including a receiving pond for receiving runoff from said collection system;
   a separation vault for receiving the runoff stream; said vault having an entrance for the runoff stream thereto; and including:
   a primary skimmer at said entrance for preventing floating objects from entering the vault which extends below the surface of said receiving pond;
   a v-shaped holding chamber at the base of the vault for catching and holding particulate matter as the particulate matter drops out of the runoff stream;
   at least one plate module having plural corrugated plates spaced apart from one another therein for providing a support for bioslime for aerobic and then anaerobic treatment of the runoff stream;
   a final skimmer located at the rear of said vault including a final skimmer plate for directing floating objects and a floating hose for removing floating objects from said runoff stream; and
   an exit point for allowing egress of the runoff stream from said vault.

11. The apparatus of claim 10 wherein said collection system includes screening material at the entrance of the pond for pre-screening large particles, said screening material including organic bales having fiberglass matting thereabout.

12. The apparatus of claim 11 which further includes a first electrostatic field generator for generating an electrostatic field along a stretch of said conduit.

13. The apparatus of claim 10 which includes a second electrostatic field generator for generating an electrostatic field about said separation vault entrance.

14. The apparatus of claim 10 wherein said vault includes a chemical injector for injecting a precipitation/flocculation-causing chemical into the runoff stream to facilitate the removal of phosphorous compounds from the runoff stream.

15. The apparatus of claim 10 which includes an air injection system for injecting air into the spaces between said aerobic plates.

16. The apparatus of claim 10 wherein said vault includes an eduction mechanism for removing particulate matter which is collected in said holding chamber, said eduction mechanism including a slotted pipe located adjacent the bottom of said holding chamber and having a connection thereto external of said vault.

17. The apparatus of claim 10 which includes a filter located externally across said exit point for finally filtering particulate matter from the runoff stream.

18. Apparatus for removing contaminants, including particulate material, from water runoff from streets and ground surfaces comprising:
   a collection system for collecting runoff, including:
   a receiving pond for receiving runoff from said collection system including a geotextile pre-screening fence arrayed about an entry end of said receiving pond to remove large particulate matter from the runoff;
   a first electrostatic field generator for generating an electrostatic field along a stretch of said pond;
   a separation vault for receiving the runoff stream; said vault having an entrance for the runoff stream thereto; said vault including:
   a primary skimmer at said entrance for preventing floating objects from entering the vault, said primary skimmer extending below the surface of said pond when said pond is at a level sufficient to direct water into said vault entrance;
   a second electrostatic field generator for generating an electrostatic field about said entrance;
   a chemical injector for injecting a precipitation/flocculation-causing chemical into the runoff stream to promote the removal of phosphorous compounds from the runoff stream;
   a holding chamber at the base of the vault having a substantially v-shaped base for catching and holding particulate matter as the particulate matter drops out of the runoff stream;
   an eduction mechanism for removing particulate matter from said holding chamber, said eduction mechanism including an eductor pipe located adjacent the bottom of said holding chamber and having slits on the bottom half thereof, and having a connection external of said vault to facilitate pumped removal of particulate matter from said holding chamber;
   at least one plate module having plural corrugated plates spaced apart from one another therein for providing a support for bioslime for aerobic and then anaerobic treatment of the runoff stream;
   an air injection system for injecting air into the spaces between said aerobic plates;
   a final skimmer located at the rear of said vault including a floating hose for removing waste oil from said runoff stream;
   a runoff-stream exit point; and
   a filter located externally across said exit point for finally filtering particulate matter from the runoff stream.

19. The apparatus of claim 18 wherein said plate module includes a series of plates, each plate being oriented between 50° and 70° from the horizontal and having corrugations therein which are approximately about $\frac{1}{2}$" deep $\times 2\frac{3}{4}$ long, and wherein fiberglass separators are provided to space said plates apart by a predetermined distance.

20. The apparatus of claim 18 which includes a waste oil container for receiving and holding waste oil, and which further includes environmentally acceptable means for removing waste oil from said waste oil container.

* * * * *